(12) United States Patent
Pabon

(10) Patent No.: US 6,671,224 B1
(45) Date of Patent: Dec. 30, 2003

(54) ACTIVE REDUCTION OF TOOL BORNE NOISE IN A SONIC LOGGING TOOL

(75) Inventor: Jahir Pabon, Brookfield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/227,732

(22) Filed: Aug. 26, 2002

(51) Int. Cl.$^7$ ............... G01V 1/40; H04B 15/00
(52) U.S. Cl. ............... 367/82; 367/25; 175/40; 166/254.2; 181/106
(58) Field of Search .............. 367/25, 82; 175/40; 166/254.2, 73; 181/104, 106, 111, 112

(56) References Cited

U.S. PATENT DOCUMENTS

| | | | |
|---|---|---|---|
| 2,043,416 A | * 6/1936 | Lueg | 18/102 |
| 4,473,906 A | * 9/1984 | Warnaka et al. | 381/71 |
| 5,036,945 A | 8/1991 | Hoyle et al. | 181/104 |
| 5,088,575 A | * 2/1992 | Eriksson | 181/206 |
| 5,347,585 A | * 9/1994 | Taki et al. | 381/71 |
| 5,408,441 A | * 4/1995 | Barr et al. | 367/15 |
| 5,475,761 A | * 12/1995 | Eatwell | 381/71 |
| 5,639,997 A | * 6/1997 | Mallett | 181/102 |
| 5,780,784 A | * 7/1998 | Robbins | 181/102 |
| 5,796,677 A | 8/1998 | Kostek et al. | 367/25 |

FOREIGN PATENT DOCUMENTS

| | | | |
|---|---|---|---|
| WO | WO 99/56155 | 4/1998 | G01V/1/52 |
| WO | WO 01/73478 A3 | 3/2001 | G01V/1/52 |
| WO | WO 01/73478 A2 | 3/2001 | G01V/1/52 |

OTHER PUBLICATIONS

Fuller, C. R. et al. "Active Control of Sound and Vibration". *IEEE Control Systems*, pp. 9–19, (Dec., 1995).

Kuo, S. M. et al. "Design of Active Noise Control Systems with the TMS320 Family". *Texas Instruments Technical Report SPRA042*, (Jun., 1996).

Liao, W. H. et al. "Characteristics of Enhanced Active Constrained Layer Damping Treatments with Edge Elements, Parts 1 and 2". *Journal of Vibrations and Acoustics*, vol. 120, pp. 886–900, (Oct., 1998).

Maillard, J. et al. "Active Control of Sound Radiation from Cylinders with Piezoceramic Actuators and Structural Acoustic Sensing". *ASA 133rd Meeting*, (Jun., 1997). The attached copy was obtained from the following URL: http://www.val.me.vt.edu/Presentations/ControlofSoundRadiation/slides–asa–06–97 paper all type1.pdf.

* cited by examiner

*Primary Examiner*—Nelson Moskowitz
(74) *Attorney, Agent, or Firm*—John L. Lee; William B. Batzer; John J. Ryberg

(57) ABSTRACT

A sonic logging tool that can be positioned within a fluid-filled borehole includes an axially distributed active vibration control system to reduce tool borne noise. The tool includes an acoustic transmitter, an axial array of acoustic receivers, and actuator assemblies that are coupled to cancel tool mode vibrations at stations along the receiver section of the tool. In a preferred embodiment, force is applied in feedback mode based on tool mode vibrations sensed at each station. The force at each station is applied by a real-time computational algorithm using feedback. The feedback includes weighting to accommodate monopole or dipole tool mode vibration. The computational algorithm includes FIR processing of signals received from a vibration sensor assembly. The force applied at a given station is a function of tool mode vibration measured at that station and the predetermined values of a set of FIR filter coefficients associated with the given station. The predetermined FIR filter coefficients are determined by an iterative optimization technique. Alternatively, the force at each station may be applied using feed-forward.

26 Claims, 17 Drawing Sheets

SECTION A - A

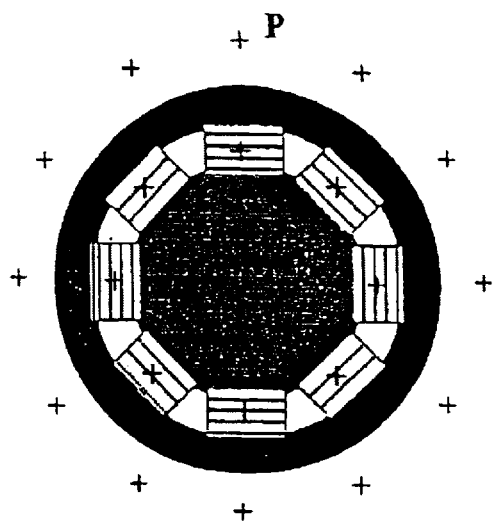
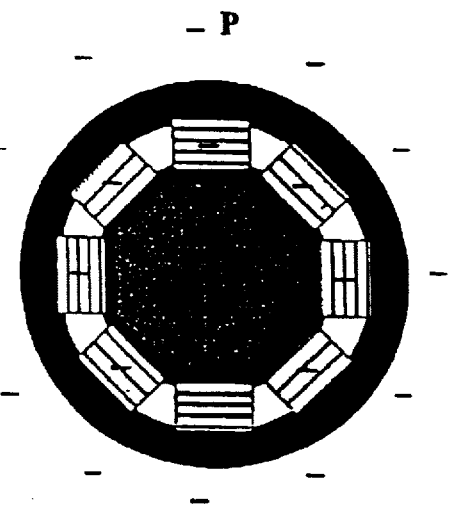
FIG. 3A                    FIG. 3B
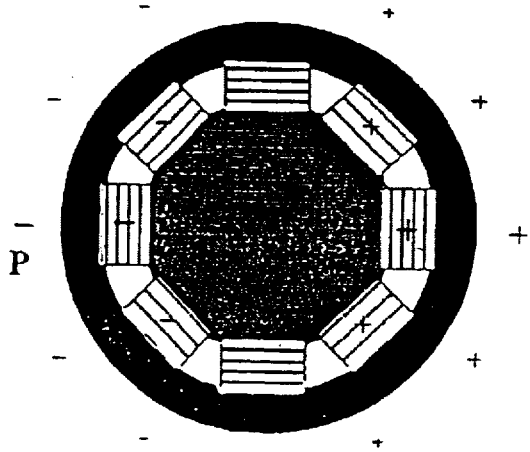
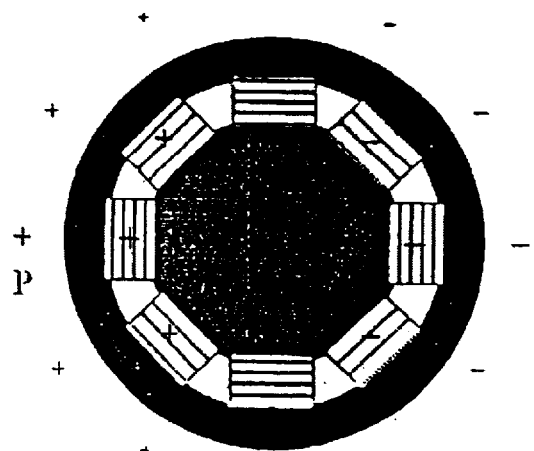
FIG. 4A                    FIG. 4B

Basic feedforward solution

Procedure: Solve in discrete time domain

1. Compute G's through finite differences using unit pulse as input

2. Reconstruct the $V_i$ as a linear superposition $$V_{i,k} = \sum_{l=1}^{k} G_{s,vi,k-l+1} \cdot S_l + \sum_{j=1}^{n} \sum_{l=1}^{k} G_{cj,vi,k-l+1} \cdot C_{j,l}$$

Equating to 0 gives $$\sum_{j=1}^{n} G_{cj,vi,1} \cdot C_{j,k} = -\sum_{j=1}^{n} \sum_{l=1}^{k-1} G_{cj,vi,k-l+1} \cdot C_{j,l} - \sum_{l=1}^{k} G_{s,vi,k-l+1} \cdot S_l$$

or for the $F_{j,k}$ $$\sum_{j=1}^{n} G_{cj,vi,1} \cdot F_{j,k} = -\sum_{j=1}^{n} \sum_{l=1}^{k-1} G_{cj,vi,k-l+1} \cdot F_{j,l} - G_{s,vi,k}$$

FIG. 17

ACTIVE REDUCTION OF TOOL BORNE NOISE IN A SONIC LOGGING TOOL

This application is related to co-owned U.S. Pat. No. 5,036,945 to Hoyle et al., co-owned U.S. Pat. No. 5,796,677 to Kostek et al., and co-owned, U.S. application Ser. No. 09/537,836, filed Mar. 29, 2000, which claims priority to co-owned international patent application no. PCT/IB01/00447, filed Mar. 21, 2001 and published Oct. 4, 2001.

FIELD OF THE INVENTION

The present invention is directed to exploration and development of sources of hydrocarbons and particularly to such exploration by acoustic investigations of the properties of the formations traversed by a borehole. More specifically, the present invention is directed to an apparatus and method for measuring formation properties by transmitting an acoustic signal into the formation and for detecting the acoustic signal at a spaced detector after it has propagated through the formation, wherein the apparatus and method include means for reducing tool mode vibration in a sonic logging tool.

BACKGROUND OF THE INVENTION

In a conventional sonic logging a tool containing an acoustic transmitter and an array of acoustic receivers is lowered into a borehole to measure the propagation of acoustic and elastic waves in earth formation outside the borehole.

Difficulties arise because waves propagating directly along the tool body (i.e., not propagating in earth formation) are also detected by the receiver array. These "tool waves" introduce errors unless their effects can be filtered out. Traditionally, this is dealt with by using a "slow tool", i.e., a tool having a structure designed to slow down the tool waves to permit filtering by time of arrival at the receiver array. Slow tools use slotted sleeves, grooved collars, and attenuation components.

Schlumberger Technology Corporation, the assignee of this application, provides tools having slotted sleeves, grooved collars, and attenuation components to permit filtering by time of arrival at the receiver array. Schlumberger Technology Corporation provides an acoustic wireline tool, the Dipole Shear Sonic Imager Tool (DSI), that operates in a manner substantially as set forth in co-owned U.S. Pat. No. 5,036,945 to Hoyle et al. The above-mentioned U.S. patent application Ser. No. 09/537,836 (US national entry of published international application WO 01/73478 A3 "Dipole Logging Tool") is another example of a slow wireline sonic tool. Schlumberger Technology Corporation also provides an acoustic logging while drilling (LWD) tool (the "ISONIC Tool") that operates in a manner substantially as set forth in co-owned U.S. Pat. No. 5,796,677 to Kostek et al. Both "DSI" and "ISONIC" are trademarks of Schlumberger.

References in active noise control literature include "Active Control of Sound Radiation from Cylinders with Piezoceramic Actuators and Structural Acoustic Sensing", J. Mailliard, C. Fuller, ASA 133rd meeting—Penn State, June 1997; "Characteristics of Enhanced Active Constrained Layer Damping Treatments with Edge Elements, Parts 1 and 2. Journal of Vibrations and Acoustics, pp 886–900, Volt 120, October 1998; "Active Control of Sound and Vibration" by C. R. Fuller and A. H. von Flotow, IEEE Control Systems, December 1995, pp. 9–19; "Design of Active Noise Control Systems With the TMS320 Family", S. M. Kuo et al, Texas Instruments Technical Report SPRA042, June 1996.

SUMMARY OF THE INVENTION

The invention provides a method and an apparatus for reducing tool borne noise in a sonic logging tool. The preferred method includes distributed active cancellation of tool mode vibration using digital filters, preferably finite impulse response filters (FIR filters). The preferred apparatus includes an acoustic logging tool that can be positioned within a fluid-filled borehole, the tool having an axially distributed active vibration control system with actuator assemblies coupled to cancel tool mode vibrations at each acoustic receiver along the receiver section of the tool.

The method reduces tool borne noise in a sonic logging tool having an acoustic transmitter and an axial array of acoustic receivers. The method comprises canceling tool mode vibration using an axially distributed active control system The location of each acoustic receiver defines a station. Actively canceling tool mode vibration includes applying a force to the tool at each station.

In a preferred embodiment, force is applied in feedback mode based on measuring tool mode vibration at each station. The value of the force at each station is established by a real-time computational algorithm using a feedback model. The feedback includes constant azimuthal weighting to accommodate monopole tool mode vibration, or sinusoidal azimuthal weighting to accommodate dipole tool mode vibration or other appropriate weighting to accommodate other tool mode vibration. The computational algorithm includes digital signal processing of signals from a vibration sensor assembly. Preferably, digital signal processing of vibration sensor signals is through digital FIR filters. The force applied at a given station is a function of tool mode vibration measured at that station and the predetermined values of a set of FIR filter coefficients. Each FIR filter has at least two filter coefficients. Preferably each FIR filter is a 7-order FIR filter having seven coefficients. The predetermined values of the seven coefficients of each FIR filter are determined by an iterative optimization technique. The preferred iterative optimization technique includes: a) initializing the value of the seven coefficients of the FIR filter in each elemental feedback loop; b) firing the acoustic transmitter and recording vibration at every element of every station of a tool for a period of time with the tool in a water tank and the feedback system running; c) summing the squares of the recorded data; d) modifying filter coefficients using an optimization technique to minimize sum of squares; e) repeating steps b)–d) until the sum is sufficiently small; and f) saving optimized values of filter coefficients.

In an alternative embodiment, each force is applied in feed-forward mode. The value of each force is established by a real-time computational algorithm in an active feed-forward control system. The feed-forward model includes constant azimuthal weighting to accommodate monopole tool mode vibration, or sinusoidal azimuthal weighting to accommodate dipole tool mode vibration. The force applied at a given station is a function of transmitter output and the predetermined values of the FIR filter coefficients. Each FIR filter uses a number of coefficients, up to a number as large as the number of time samples used to define the acoustic transmitter firing pulse. Preferably each FIR filter is a 100-order FIR filter having a hundred coefficients. The predetermined values of the 100-order FIR filter coefficients are determined by using an algebraic technique to solve for zero vibration at all stations. The algebraic technique includes: a) firing the acoustic transmitter with a unit pulse and recording tool vibration at every element of every station with the active control system not running; b) applying a unit pulse at active elements of a first station having active elements, applying the unit pulse with the appropriate azimuthal weighting, including constant azimuthal weighting for monopole configuration, including sinusoidal azimuthal weighting for dipole configuration, and recording tool vibration at every element of every station, with the active control system not running; c) repeating b) for every station having active elements; d) using all the tool vibration recordings from a)–c) to compute a value for every FIR filter coefficient so that the resulting tool vibration at all stations is zero when the feed-forward control system is running; and e) saving computed values of filter coefficients.

The invention provides an acoustic logging tool that can be positioned within a fluid-filled borehole. The tool includes an elongated cylinder defining an axis, an acoustic transmitter mounted to the cylinder, an axial array of acoustic receivers mounted along the cylinder; and an axially distributed active vibration control system. The control system includes at least one cylindrical reaction mass co-axially mounted within the cylinder, and an axial array of actuators coupled to exert force between said at least one cylindrical reaction mass and the cylinder.

The location of each acoustic receiver defines a station. The axial array of actuators includes one actuator assembly located at each station. Each actuator assembly includes multiple actuators in an azimuthal array. Each actuator includes multiple actuator elements, in a preferred embodiment multiple stacked actuator elements.

The control system includes a plurality of electrical outputs. Each actuator element is wired to receive a corresponding one of the plurality of electrical outputs.

The acoustic logging tool further includes an axial array of vibration sensor assemblies, one vibration sensor assembly located at each station. Signals from sensor elements in a sensor assembly are summed using appropriate weighting for monopole or dipole to generate a tool vibration output which is coupled to the active control system.

Brief Description of the Drawings

FIGS. 3A and 3B illustrate the use of the stacked-element actuators of FIG. 2 in monopole mode.

FIGS. 4A and 4B illustrate the use of the stacked-element actuators of FIG. 2 in the X-axis dipole mode.

FIG. 17 illustrates the preferred algebraic technique for computing filter coefficients in the flowchart of FIG. 16.

DETAILED DESCRIPTION OF THE INVENTION

The inventor recognized that the "slow tool" approach to minimizing tool wave errors in acoustic logging, the approach that uses complex shapes to increase tool slowness (i.e. using time separation to minimize the effects of tool borne noise), imposes too great a penalty in tool strength to be useful in difficult applications such as logging while drilling.

The inventor further recognized that the "slow tool" approach and approaches involving attenuation of tool borne noise, introduce complex shapes, and that complex shapes produce receiver array output signals that are hard to predict and interpret.

The inventor determined that, under carefully controlled experimental conditions, acoustic measurement errors caused by tool waves in a simple tool such as a steel pipe can be predicted and substantially cancelled out by the use of an appropriate signal processing technique. Experiments were conducted using a simple pipe tool and a multi-wave processing algorithm to validate this approach. However, the inventor determined that the use of such signal processing techniques can lead to appreciable uncertainty when the speed of the tool mode and the speed of the borehole mode are equal or very nearly equal.

The inventor discovered that signal processing techniques similar to those described above could be used in an active control system to cancel the actual tool mode vibrations in the region where the acoustic receivers are located. The inventor originally proposed an actuator assembly placed between the tool transmitter and the receiver array, an arrangement typically used in noise/vibration control. However, the inventor recognized that the continuous re-coupling of energy between the rock and the LWD tool while the vibrations propagate along the formation surrounding the borehole would severely limit the value of this approach.

The inventor then discovered that a distributed active control system using an array of actuators and an appropriate control algorithm can be used in to significantly reduce, if not cancel, the actual tool mode vibrations over a predetermined length of the tool, and such a distributed active control system can be configured to cover exactly the region of the tool where the acoustic receivers are located, thereby achieving substantially complete cancellation of actual tool mode vibrations over the full length of the region of the acoustic receivers.

The inventor found that a distributed active control system using an array of actuators and an appropriate control algorithm would be much more effective than using a single actuator assembly placed between the tool transmitter and the receiver array. The inventor validated, through computer simulations, that a distributed active control system using an array of actuators and an appropriate control algorithm can be used to substantially eliminate "tool borne noise" effects on acoustic logging.

APPARATUS OF THE INVENTION

Figure 1:
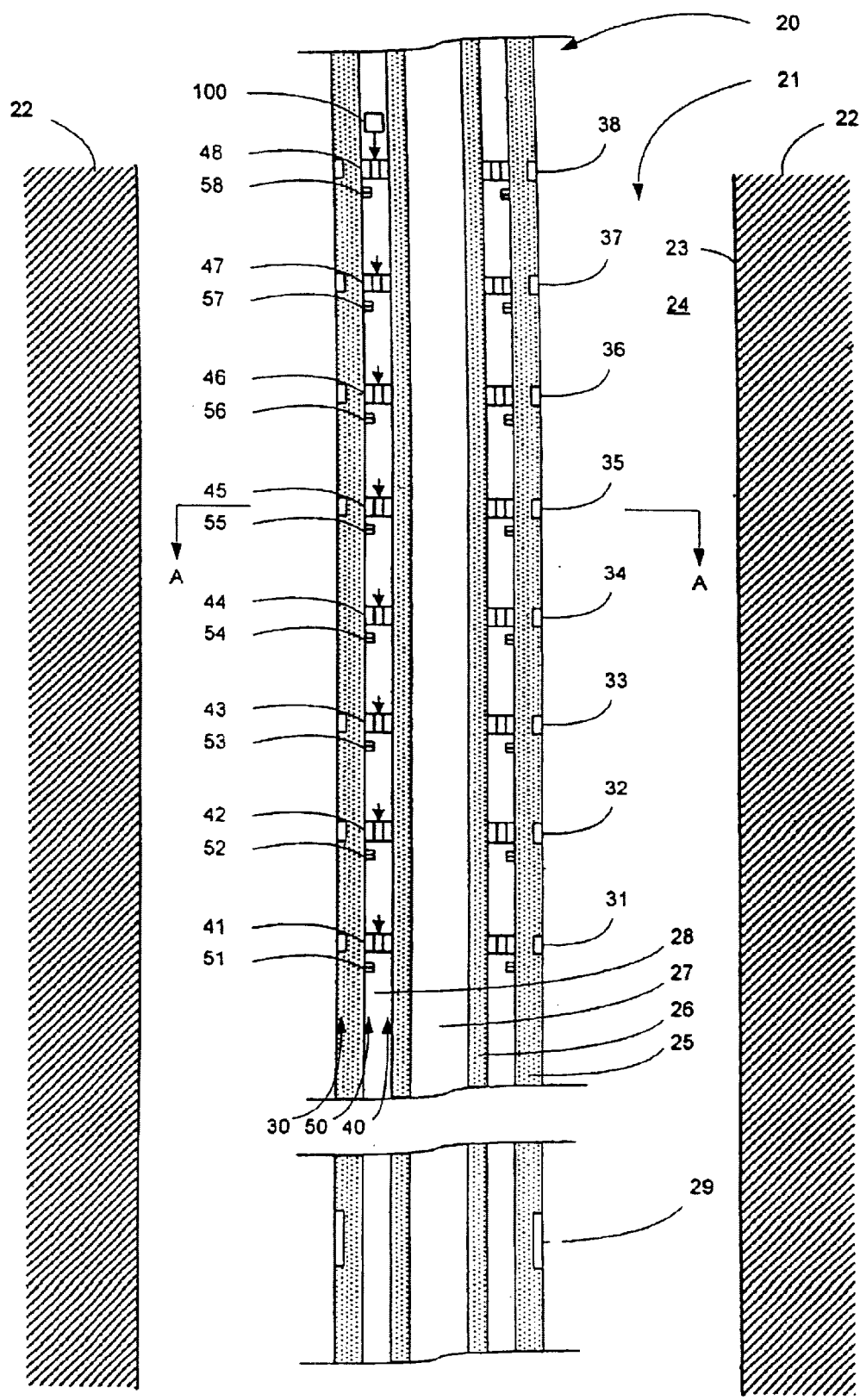
FIG. 1 is a schematic illustration of a first preferred embodiment of a logging while drilling (LWD) tool having a linear array of ring-shaped electro-acoustic actuator assemblies for vibration cancellation in accordance with the present invention.

FIG. 1 is a schematic illustration of a first preferred embodiment of a logging while drilling (LWD) tool having a distributed active control system for cancellation of tool mode vibration over the region of the acoustic receiver array in accordance with the present invention. FIG. 1 shows LWD tool 20 in borehole 21 of earth formation 22. Tool 20 includes drill collar 25 and mandrel 26. Mandrel 26 defines inner mud channel 27. Transmitter 29 and acoustic receivers 31–38 of receiver array 30 are mounted to the outer surface of drill collar 25 and axially spaced apart in conventional manner. FIG. 1 shows receiver array 30 having eight acoustic receivers. In the preferred embodiment of FIG. 1, the number of receivers is eight, although any number between 8 and 16 would be very acceptable.

The invention, in this first preferred embodiment, provides a distributed active vibration control system located in space 28 between drill collar 25 and mandrel 26. This control system includes linear array 40 of ring-shaped electro-acoustic actuator assemblies extending along the length of receiver array 30. Actuator array 40 is shown in FIG. 1 as having eight ring-shaped actuator assemblies, 41–48, mounted to the inner surface of drill collar 25. In the first preferred embodiment, actuator array 40 would include at least as many actuators as there are acoustic receivers, i.e., 8. The control system, in its preferred feedback embodiment, also includes tool vibration sensor array 50 extending along the length of receiver array 30. Sensor array 50 is shown in FIG. 1 as having eight tool vibration sensor assemblies 51–58 mounted to the inside of drill collar 25. As with the actuator array, sensor array 50 would include at least as many sensor assemblies as there are acoustic receivers.

Sensor array 50 includes one sensor assembly located at each station. Each sensor assembly includes multiple (at least four, preferably eight) sensor elements (e.g., accelerometers) in an azimuthal array. The signals from sensor elements in a sensor assembly are summed using appropriate weighting (e.g., constant for monopole, sinusoidal for dipole) to generate a tool vibration output which is coupled to the active control system Space 28 between drill collar 25 and mandrel 26 is filled with pressure-backing fill fluid. In the first preferred embodiment, a single feedback controller 100 is mounted within space 28 surrounded by pressure-backing fill fluid. Feedback controller 100 includes a digital processor and digital to analog converters for outputting electrical output signals. Electrical wiring, indicated by short arrows in FIG. 1, connects individual electrical output signals from controller 100 to individual elements in the stacked-element actuators in the ring-shaped actuator assemblies. A first such element is first element 71 of first stacked element actuator 61 (FIG. 2) in first ring-shaped actuator assembly 41 (FIG. 1).

Array 50 is used to measure tool vibration. Measured tool vibration signals are used in the preferred embodiment to compute and apply appropriate drive signals to actuators 41–48. The number of actuators in array 50 is at least four and preferably eight.

Actuators 41–48 are preferably stacked-element actuators, each element formed of active material (piezoelectric, magnetostrictive, etc.). Actuators 41–48 are arrayed in an azimuthal array between drill collar 25 and mandrel 26. The stiff heavy mandrel is used as reaction mass. Drive signals to the active rings produce radial stresses that push and pull proximate portions of the drill collar in a direction opposite to that caused by the effect of the acoustic pressure around the tool, thereby reducing tool vibration over the length of the receiver array.

The active vibration control system uses the first preferred feedback control method described below to cancel the natural vibration of the drill collar to which the acoustic receivers are mounted. As a result, output signals from the receiver array will be essentially free of the influence of tool waves, which in turn will facilitate the process of extracting important acoustic rock parameters from digital data derived from the output signals from the receiver array.

Feedback controller 100 for the first preferred method for active reduction of tool borne noise is indicated in FIG. 1. Preferably, controller 100 includes eight FIR filters. These exist as digital capabilities within the feedback controller. Preferably, controller 100 includes at least one digital signal processor such as from the TMS320® DSP family of products available from Texas Instruments. FIR digital filters are discussed in more detail below under "Feedback Method".

In alternative embodiments infinite impulse response filters (IIR filters) could be used.

Actuator array 40 preferably spans the receiver section of the drill collar to which the acoustic receivers are mounted so as to modify tool dynamics over the full length of the receiver array. A single actuator assembly placed between the tool transmitter and the receiver section (an arrangement typically used in noise/vibration control) would be much less effective because of the continuous re-coupling of energy between the rock and the LWD tool as the vibration propagates along the formation surrounding the borehole. Preferably actuator array 40 spans the receiver section of the tool such that the tool dynamics are uniform over the full length of the receiver array. The coherence of the digital data derived from the output signals from the receiver array can be appreciably degraded by abrupt changes of tool dynamics within the length of the receiver array. Preferably the axial spacing between the actuators in the actuator array should be small. Preferably actuator spacing is equal to or less than the axial spacing between acoustic receivers, and less than half of the smallest wavelength of the axial tool waves to be cancelled.

Figure 2:
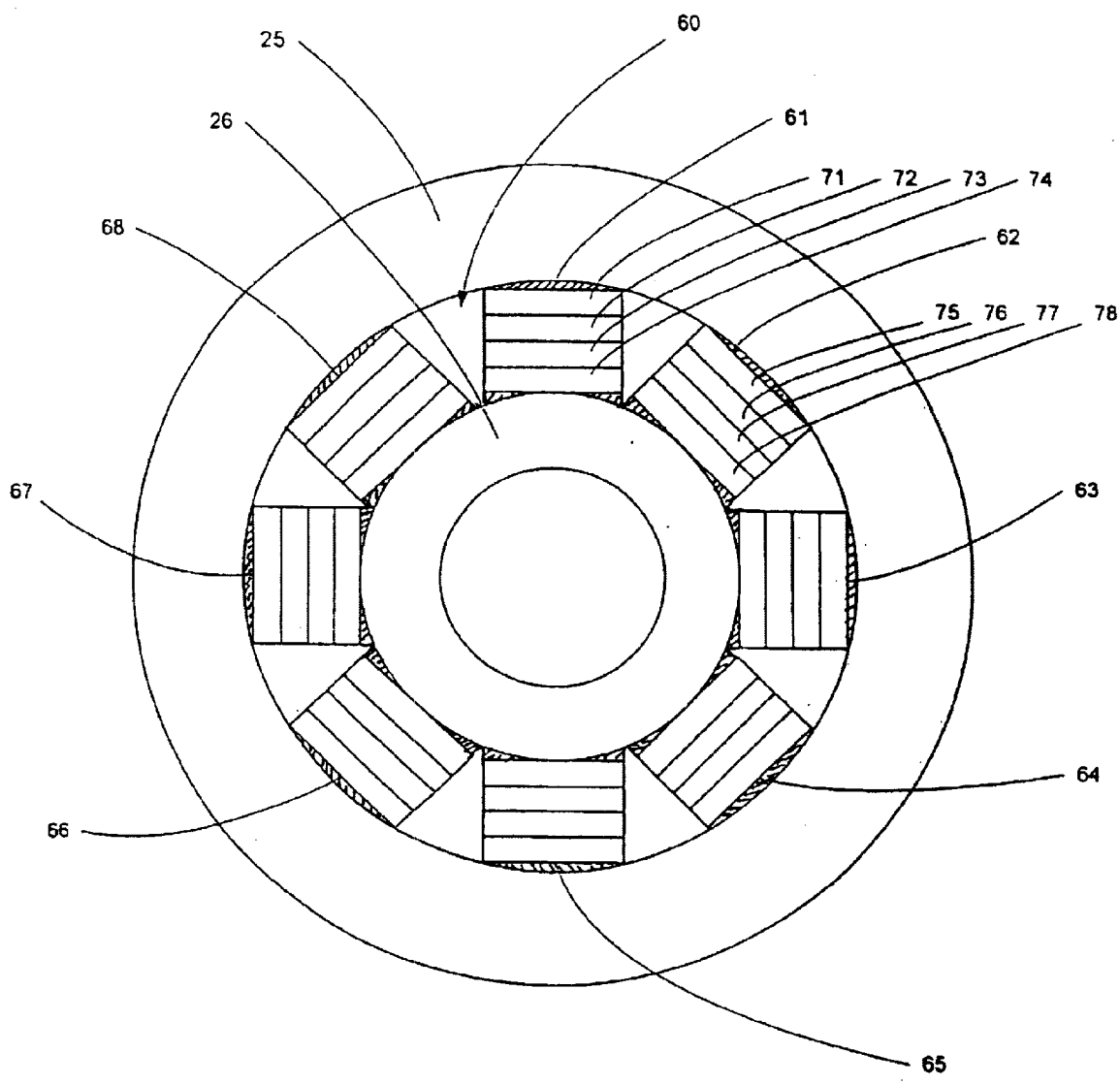
FIG. 2 is schematic sectional view across A—A in FIG. 1 showing a ring-shaped electro-acoustic stacked-element actuator assembly having eight electro-acoustic stacked-element actuators in an azimuthal array between the mandrel and the drill collar of the embodiment of FIG. 1

FIG. 2 is schematic sectional view across A–A in FIG. 1 showing eight electro-acoustic stacked-element actuators 61–68, in azimuthal array 60 between drill collar 25 and mandrel 26 of the embodiment of FIG. 1. In this schematic view the transmitter, the acoustic receivers and the associated vibration sensor assemblies shown in FIG. 1 are omitted to more clearly illustrate the stacked-element actuators of each ring-shaped actuator assembly. FIG. 2 shows eight stacked-element actuators, actuators 61 through 68, each having four elements. First stacked element actuator 61 includes stacked elements 71–74. In the preferred version, the elements are made of a piezoelectric material. In an alternative version, the elements are made of a magneto-strictive material.

FIGS. 3A and 3B illustrate qualitatively the action of the stacked-element actuators when the distributed active control system operates to cancel monopole tool mode vibration. When used in the preferred feedback mode, the control system will do this automatically when the tool is used in monopole logging mode. In monopole logging, the pressure is approximately uniform around the tool. A positive acoustic pressure around the tool tends to cause a radial contraction of the tool cross-section. Responding to a positive acoustic pressure around the tool, the active control system generates stresses in the active stacks that tend to push the tool outward to cancel the tool radial contraction. A negative acoustic pressure around the tool tends to cause a radial expansion. Responding to a negative acoustic pressure around the tool, the active control system generates stresses in the active stacks that tend to push the tool inward to cancel the tool radial expansion.

FIGS. 4A and 4B illustrate qualitatively the action of the stacked-element actuators when the distributed active control system operates to cancel X-axis dipole tool mode vibration. When used in the preferred feedback mode, the control system will do this automatically when the tool is used in dipole logging mode. In dipole logging, the non-uniform pressure profile around the tool tends to cause lateral tool movement along the direction of the dipole pressure field. Responding to the pressure profile, the active control system generates appropriate stresses in the different azimuthal zones of the active rings (i.e. individual stacks) that tend to pull or push the tool in a direction opposite to the lateral movement that would be caused by the pressure unbalance around the tool, so as to cancel lateral movement of the tool.

When used in the feed-forward mode, the coefficients of the control system must be set to cancel monopole tool mode vibration, dipole tool mode vibration, quadrupole tool mode vibration or other mode vibration depending on whether the tool is to be used in the monopole logging mode, the dipole logging mode, the quadrupole mode, or other mode.

Figure 5:
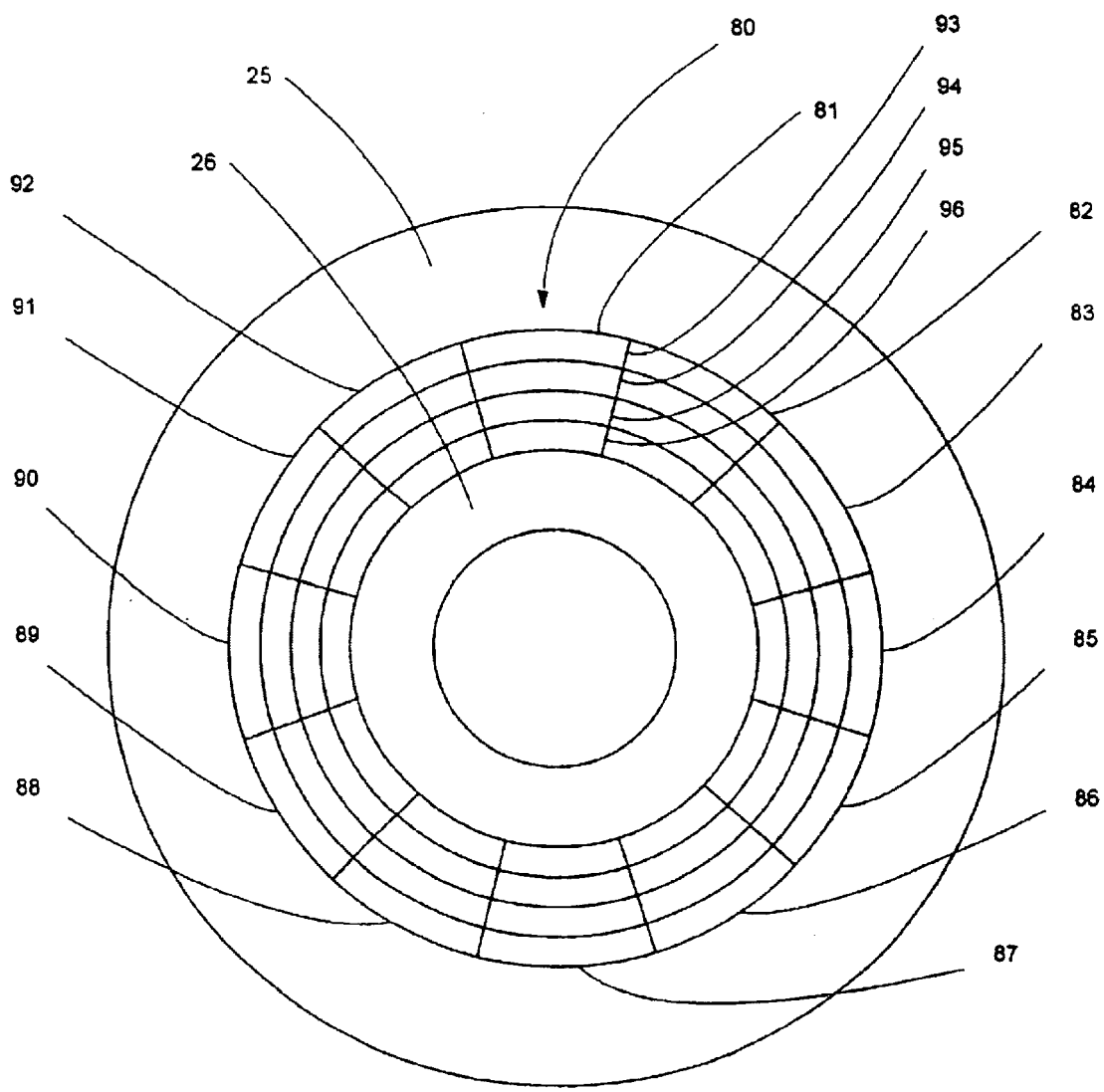
FIG. 5 is schematic sectional view of a portion of a second embodiment, showing a ring-shaped electro-acoustic stacked-segment actuator assembly having twelve stacked-segment actuators in an azimuthal array inside a cylindrical wall.

FIG. 5 is a cross section view of another alternative version. FIG. 5 shows in cross section view segmented ring actuator assembly 80, mounted between drill collar 25 and mandrel 26. In the preferred embodiment, segmented ring actuator assembly 80 includes an azimuthal array of at least four, and preferably eight stacked-segment actuators, each actuator having four segments. (FIG. 5 shows twelve stacked-segment actuators 81–92). In a preferred version, the segments are made of a piezoelectric material. In an alternative version, the segments are made of a magneto-strictive material.

Figure 6A:
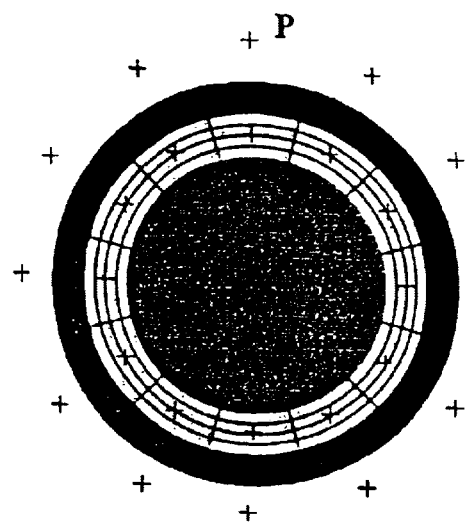
FIGS. 6A and 6B illustrate the use of the stacked-segment actuator assemblies of FIG. 5 in the monopole mode.
Figure 6B:
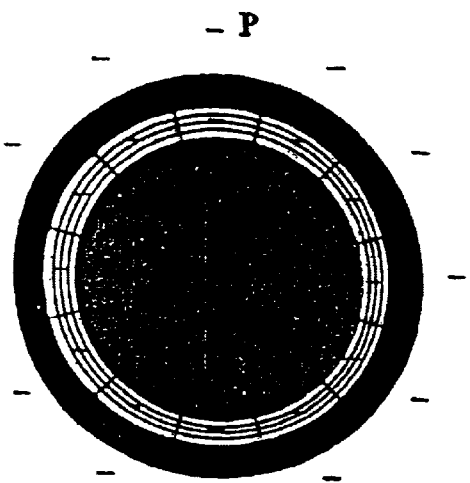

FIGS. 6A and 6B illustrate qualitatively the action of the stacked-segment actuators when the distributed active control system operates to cancel monopole tool mode vibration. Note the constant azimuthal weighting.

Figure 7A:
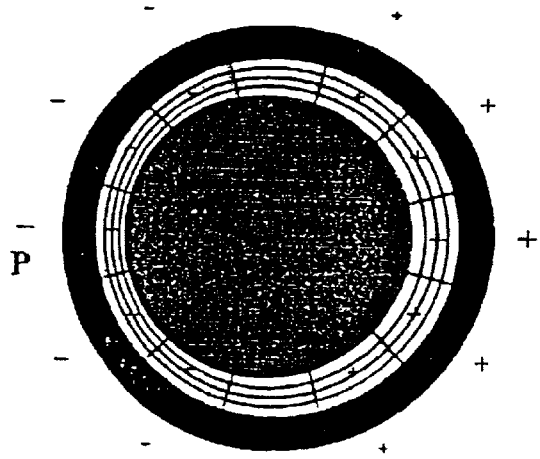
FIGS. 7A and 7B illustrate the use of the stacked-segment actuator assemblies of FIG. 5 in the X-axis dipole mode.
Figure 7B:
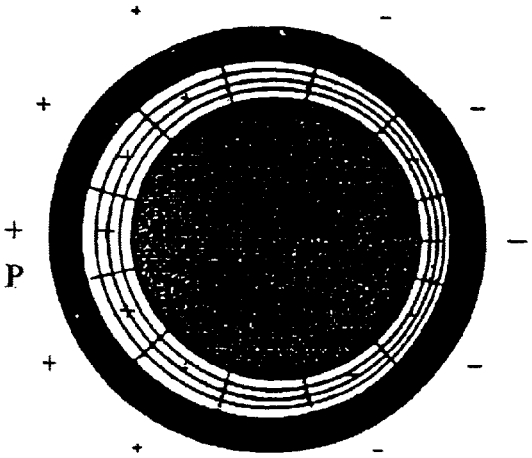

FIGS. 7A and 7B illustrate qualitatively the action of the stacked-element actuators when the distributed active control system operates to cancel X-axis dipole tool mode vibration. Note the sinusoidal azimuthal weighting.

Figure 8:
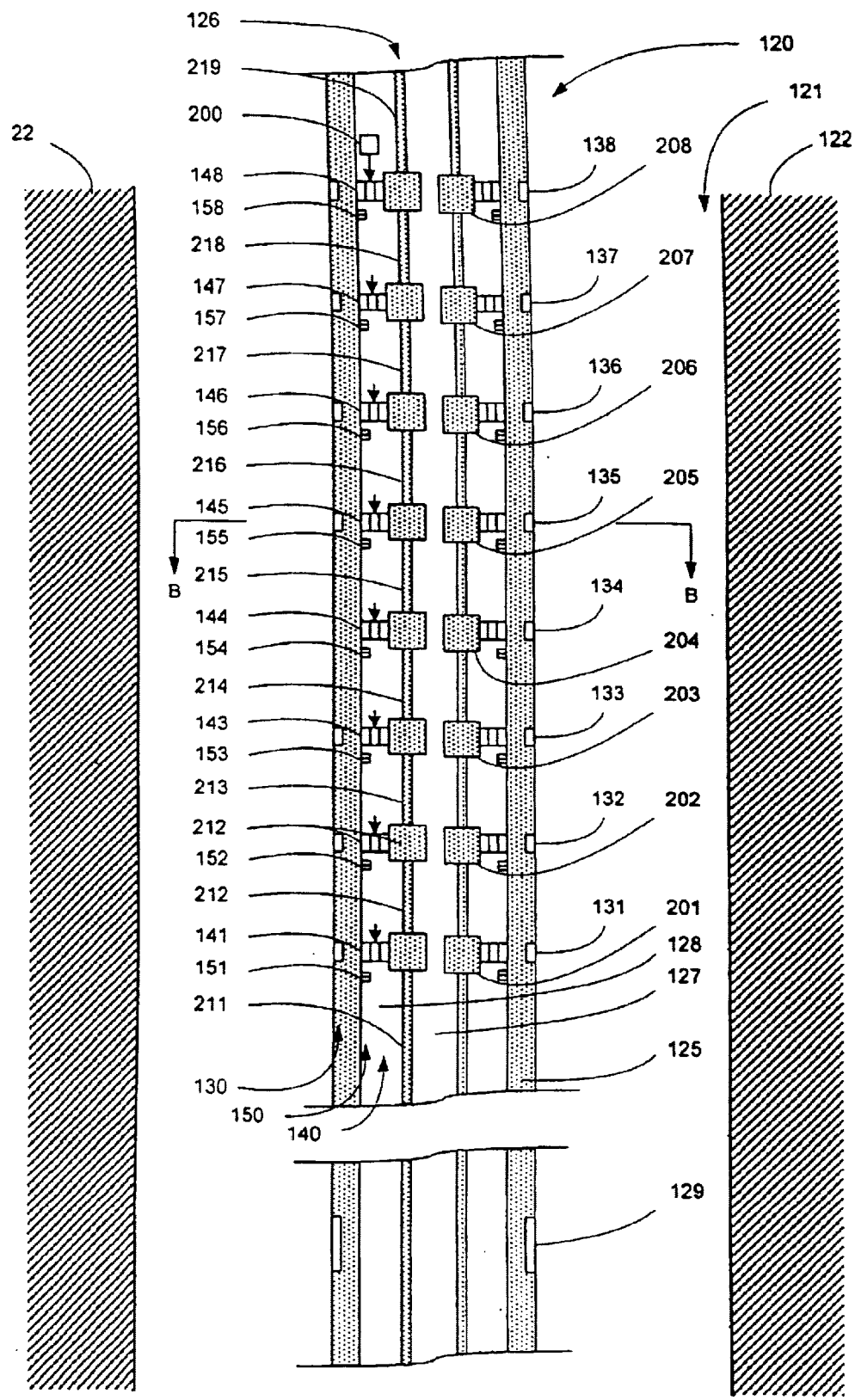
FIG. 8 is a schematic illustration of a first preferred embodiment of a wireline tool having ring-shaped electro-acoustic actuator assemblies, and associated cylindrical reaction masses in a reaction mass assembly, for vibration cancellation.

FIG. 8 is a schematic illustration of a first preferred embodiment of a wireline tool having feedback-driven actuators for vibration cancellation in accordance with the present invention. The wireline tool of FIG. 8 is functionally very similar to the LWD tool of FIG. 1.

Wireline tool 120 is shown in borehole 121 of earth formation 122. Tool 120 includes cylindrical outer casing 125 and reaction mass assembly 126. Assembly 126, as shown in FIG. 8, includes eight cylindrical reaction masses 201–208 axially stabilized by nine cylindrical axial stabilizers 211–219. Space 128 between outer casing 125 and assembly 126 is filled with pressure-backing fill fluid. Feedback controller 200 is mounted within space 128 surrounded by pressure-backing fill in the manner described above for the LWD tool. Transmitter 129 and receiver array 130 are mounted, spaced apart in conventional manner, to the outer surface of outer casing 125.

This embodiment provides actuator array 140 of feedback-driven stacked-element actuator assemblies 141–148 mounted to the inner surface of outer casing 125. Actuator array 140 covers the region of receiver array 130. The actuators are part of an active vibration control system located inside outer casing 125. The active vibration control system includes an array 150 of wireline tool vibration sensor assemblies 151–158 mounted to the inside of outer casing 125. Array 150 is used to measure wireline tool vibration. Measured wireline tool vibration signals are used in the computation of drive signals that are applied to actuator assemblies 141–148. Actuator assemblies 141–148 are preferably stacked-element actuators, each element formed of active material. Actuators 141–148 are arrayed as a cylindrical axial array between outer casing 125 and reaction mass assembly 126.

The schematic sectional view (not shown) across B—B in FIG. 8 would be similar to the schematic sectional view shown in FIG. 2 or in FIG. 5.

The distributed active vibration control system, including array 140 of ring-shaped actuator assemblies 141–148, and tool vibration sensor array 150 of the feedback version, is located in space 28 between mandrel and drill collar, as shown in FIG. 1, and equivalently in FIG. 8.

Figure 9:
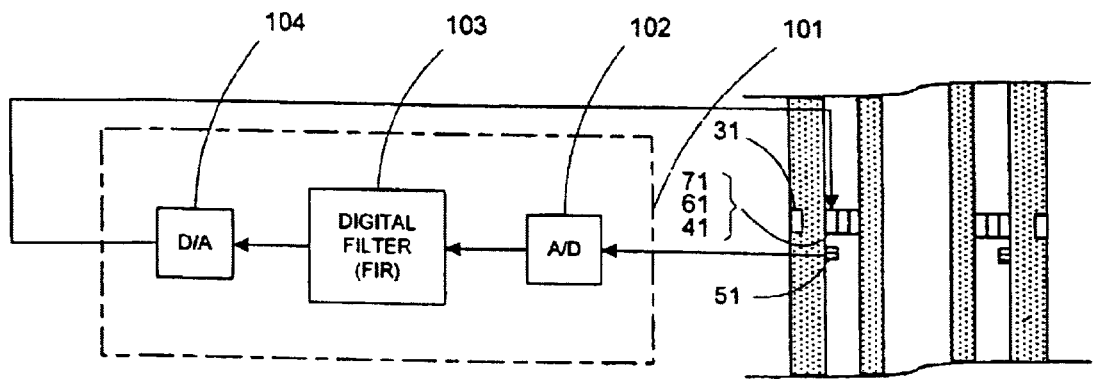
FIG. 9 shows a first feedback signal converter, including A/D, software, and D/A, associated with the first one of the eight acoustic receivers at station 1 of the LWD tool of FIG. 1, for use with the first preferred embodiment of the feedback method.

Referring again to the first preferred embodiment of FIG. 1, FIG. 9 shows a feedback signal processor element configured for use with the first preferred embodiment of the weighted-feedback method. First feedback signal converter 101 includes first A/D converter 102, first FIR filter (software) 103, and first D/A converter 104. First feedback signal converter 101, located at station 1, is associated with first element 71, of the first stacked-element array 61 (see FIG. 2), of the first ring-shaped actuator assembly 41 of the eight active control stations of the feedback controllers of the LWD tool.

Accordingly, referring again to FIG. 9, first A/D converter 102, first FIR filter 103, and first D/A converter 104, at station 1, are associated with first element 71, of first stacked-element array 61, of first ring-shaped actuator assembly 141, and with first acoustic receiver 31, and with first vibration sensor assembly 51.

The A/D converters and the D/A converters of each feedback converter 101 each have a hardware portion. The analog electrical input portion of each A/D converter is physically wired to the vibration sensor assembly at its station. As shown in FIG. 9, the analog electrical input portion of A/D converter 102 is physically wired to vibration sensor assembly 51. The analog electrical output portion of each D/A 104 is physically wired to a specific element of one of the stacked element actuators at its station. In the preferred embodiment, the FIR filters are implemented in software in shared feedback controller 100, so all filters can potentially share the same code. However, each filter has a unique address to store a set of coefficients having predetermined values established by a method in accordance with the present invention as described herein below.

The first preferred embodiment of the feedback method may also be used with the wireline tool of FIG. 8. Shared feedback controller 200, shown in FIG. 8, is substantially the same as shared feedback controller 100. FIG. 9 shows first feedback signal converter 101 including first analog to digital converter 102, first digital filter (FIR) 103, and first digital to analog converter 104.

Figure 10:
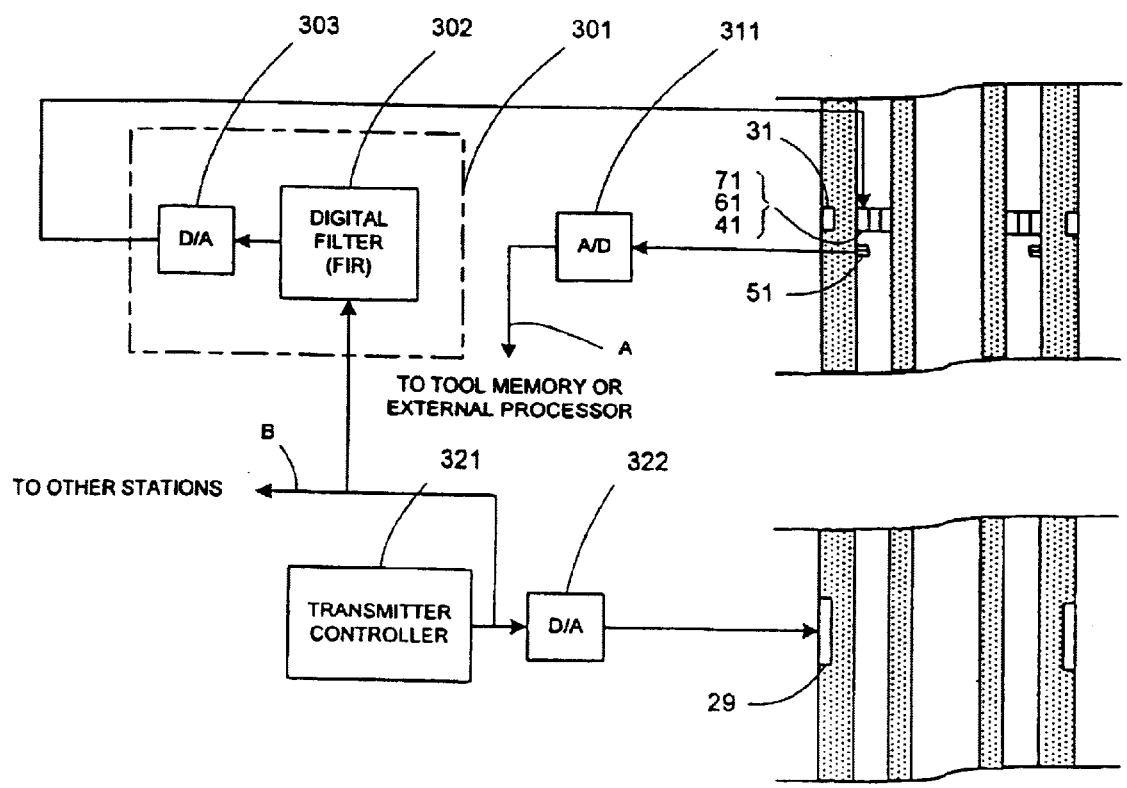
FIG. 10 shows the transmitter controller and the first feed-forward signal processor element, including software, and D/A, associated with the first one of the eight acoustic receivers at station 1 of the LWD tool of FIG. 1, for use with an alternative embodiment using the feed-forward method. It also shows the vibration sensor assembly and A/D converter needed to determine feed-forward coefficients for the FIR filters.

FIG. 10 shows a feed-forward signal processor element configured for use with the preferred embodiment of an alternative weighted feed-forward method. First feed-forward signal converter 301 includes FIR filter (software) 302, and D/A converter 303. First feed-forward converter 301, located at station 1, is associated with first element 71, of the first stacked-element array 61 (see FIG. 2), of the first ring-shaped actuator assembly 41 of the eight active control stations of the feedback controllers of the LWD tool of FIG. 1.

The analog electrical output portion of each D/A converter 322 is physically wired to a specific element of one of the stacked element actuators of the array of stacked element actuators at its station. FIG. 10 also shows vibration sensor assembly 51 and A/D converter 311. These are provided to determine coefficients for the feed-forward configuration, in cooperation with transmitter controller 321 and D/A converter 322. The primary function of transmitter controller 321 and D/A converter 322 is to power the generation of the acoustic measurements that are to be made by the tool. The additional function of determining coefficients for feed-forward distributed active control is provided by auxiliary software in transmitter controller 321.

The feed-forward method may also be used with the wireline tool of FIG. 8.

Mathematical Models

Figure 11:
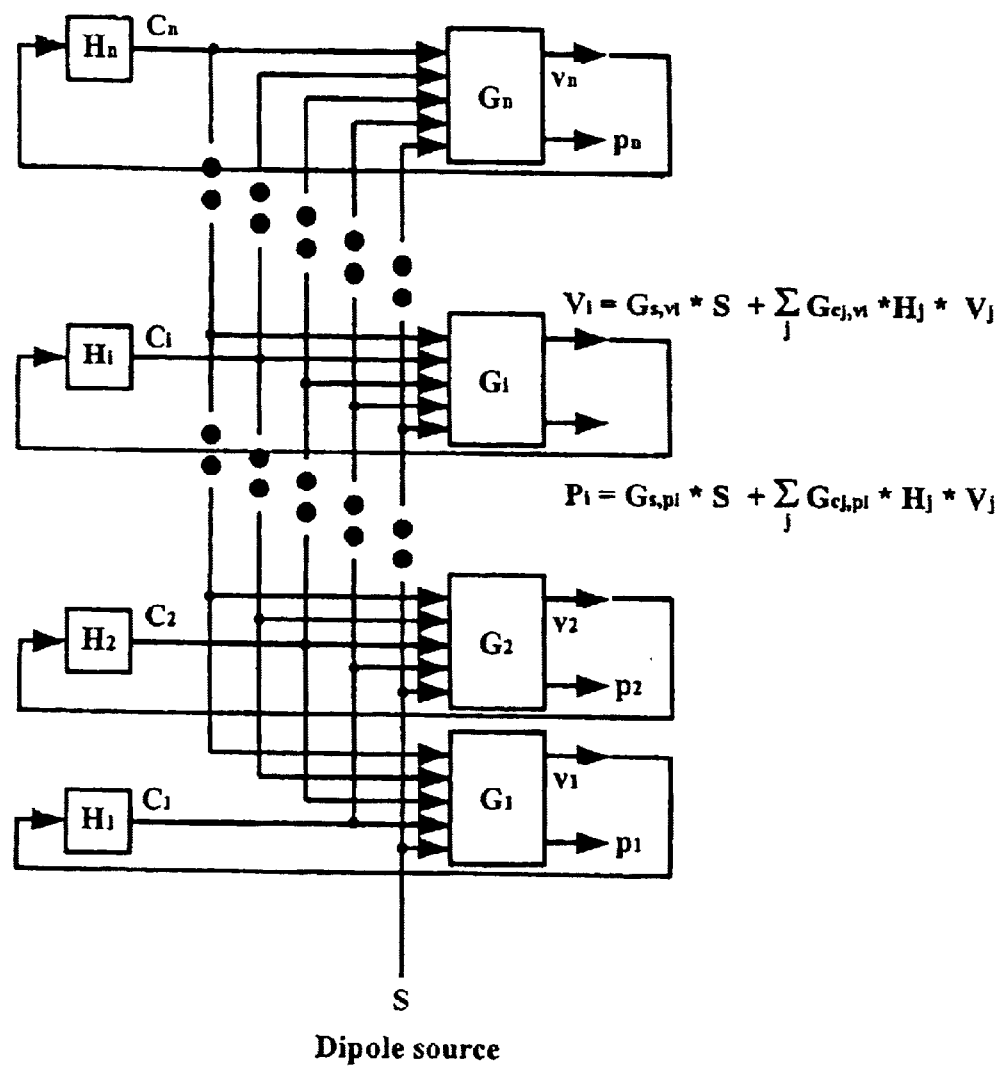
FIG. 11 is a schematic diagram illustrating the problem to be solved. It shows the process of generation of tool borne noise in a dynamic system with re-coupling at multiple locations along the borehole wall.

FIG. 11 is a schematic mathematical model of the dynamics of tool mode vibration propagation (transfer functions $G_1$–$G_n$) in an LWD tool overlaid with the feedback method.

The tool mode vibration propagation portion illustrates the continuous re-coupling of energy between the rock and the tool, which shows why a single electro-acoustic actuator assembly placed between the tool transmitter and the receiver section (an arrangement typically used in noise/vibration control) would not be effective. The feedback method shows control functions $C_{1-C_n}$ and feedback FIR digital filter functions $H_1$–$H_n$, producing cancellation values (tool borne noise) $v_1$–$v_n$ at n stations. Note that cancellation values drive the feedback FIR digital filter functions. Pressure measurement signals $p_1$–$p_n$ are unaffected.

Figure 12:
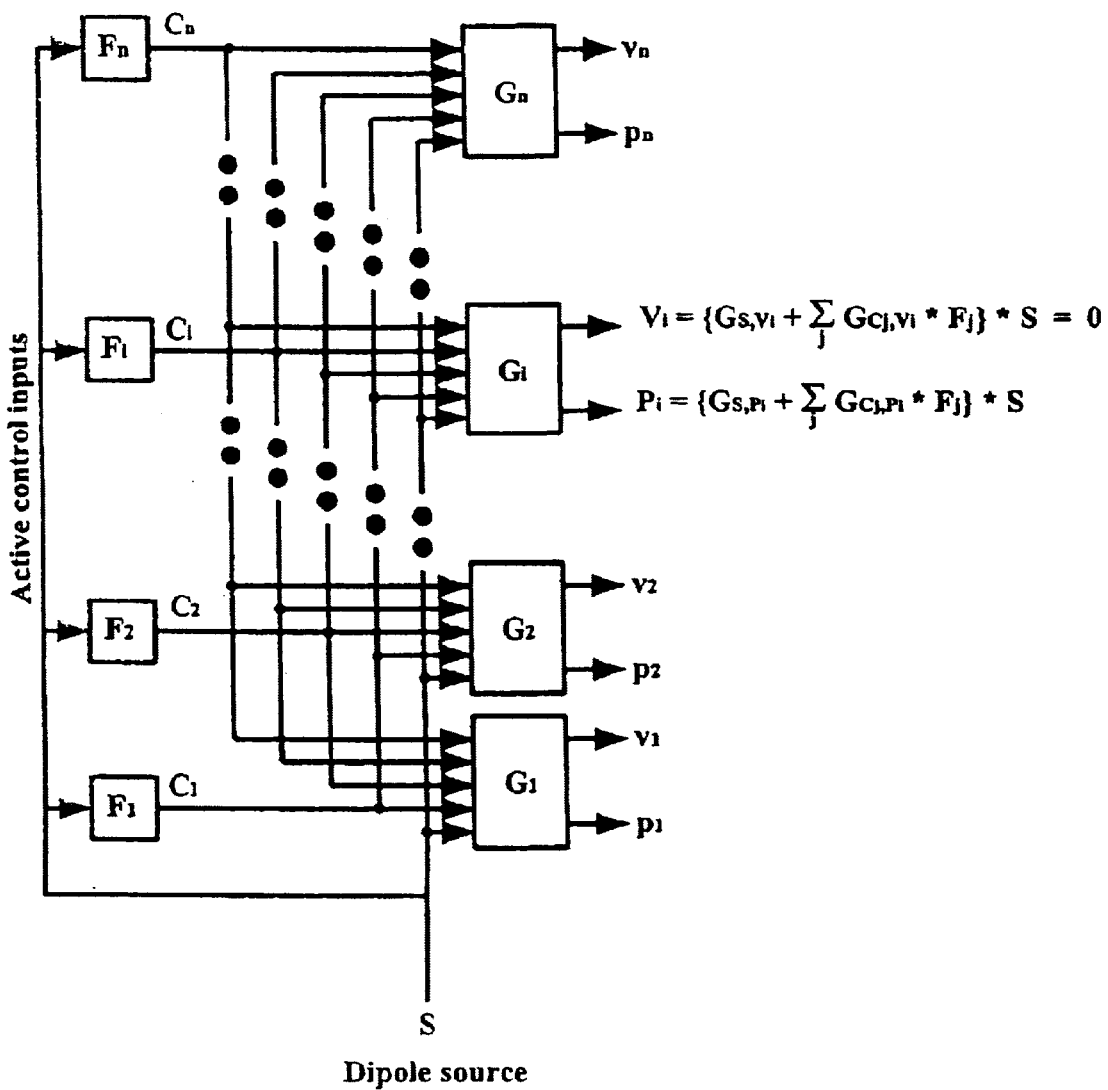
FIG. 12 is a schematic diagram, similar to FIG. 1, showing how active insertion of compensating vibration can be introduced at multiple stations along the borehole wall ed to reduce tool borne noise along a predefined length of the borehole wall.

FIG. 12 is a schematic mathematical model of the dynamics of tool mode vibration propagation (transfer functions $G_1$–$G_n$) in an LWD tool overlaid with the feed-forward method. The feed-forward method shows control functions $C_1$–$C_n$ and feed-forward FIR digital filter functions $F_1$–$F_n$. Note that transmitter output (shown as dipole source) drives the feed-forward FIR digital filter functions.

Feedback Method

Figure 13:
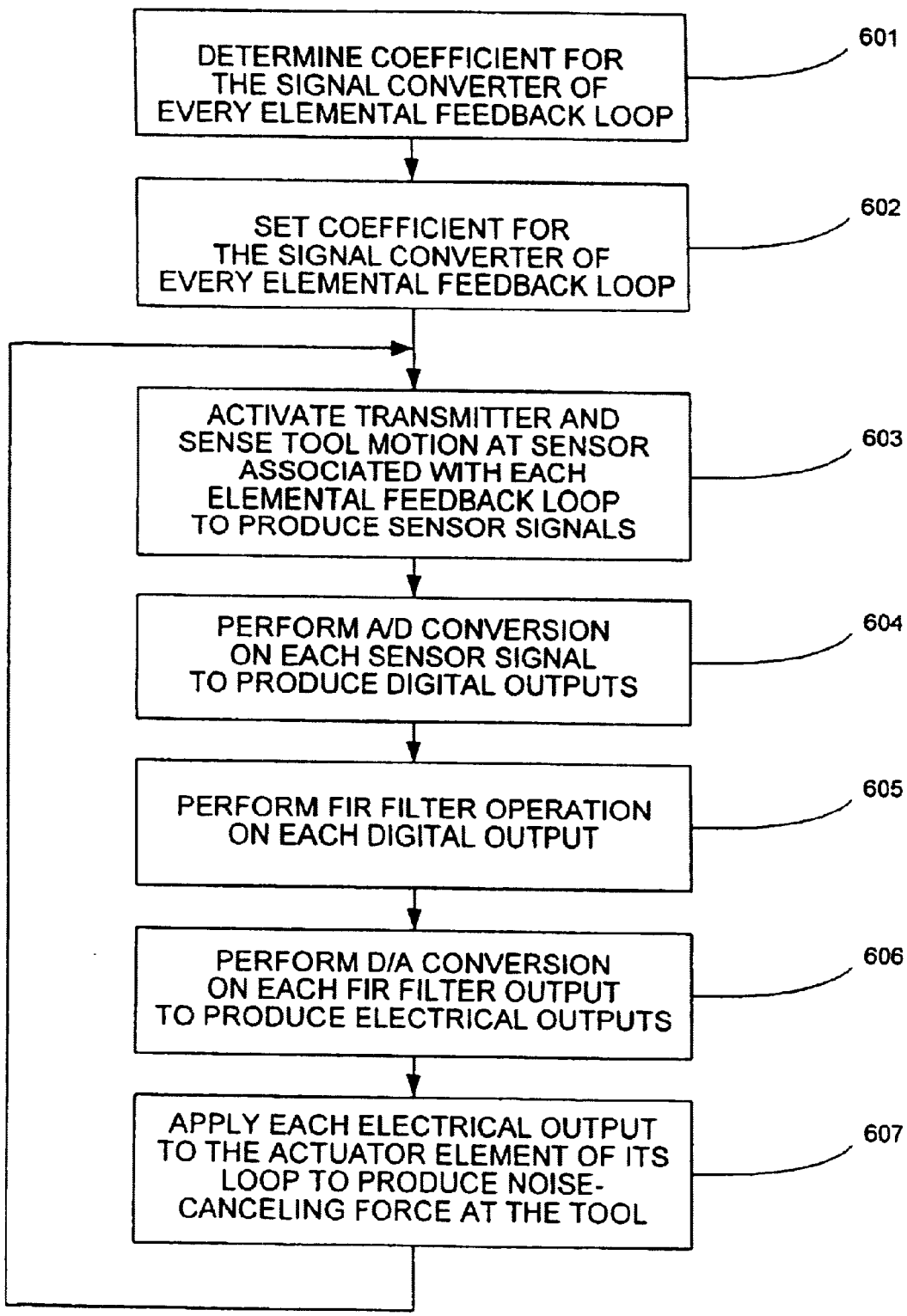
FIG. 13 is a flowchart for the first preferred embodiment of a feedback method for active reduction of tool borne noise.
Figure 14:
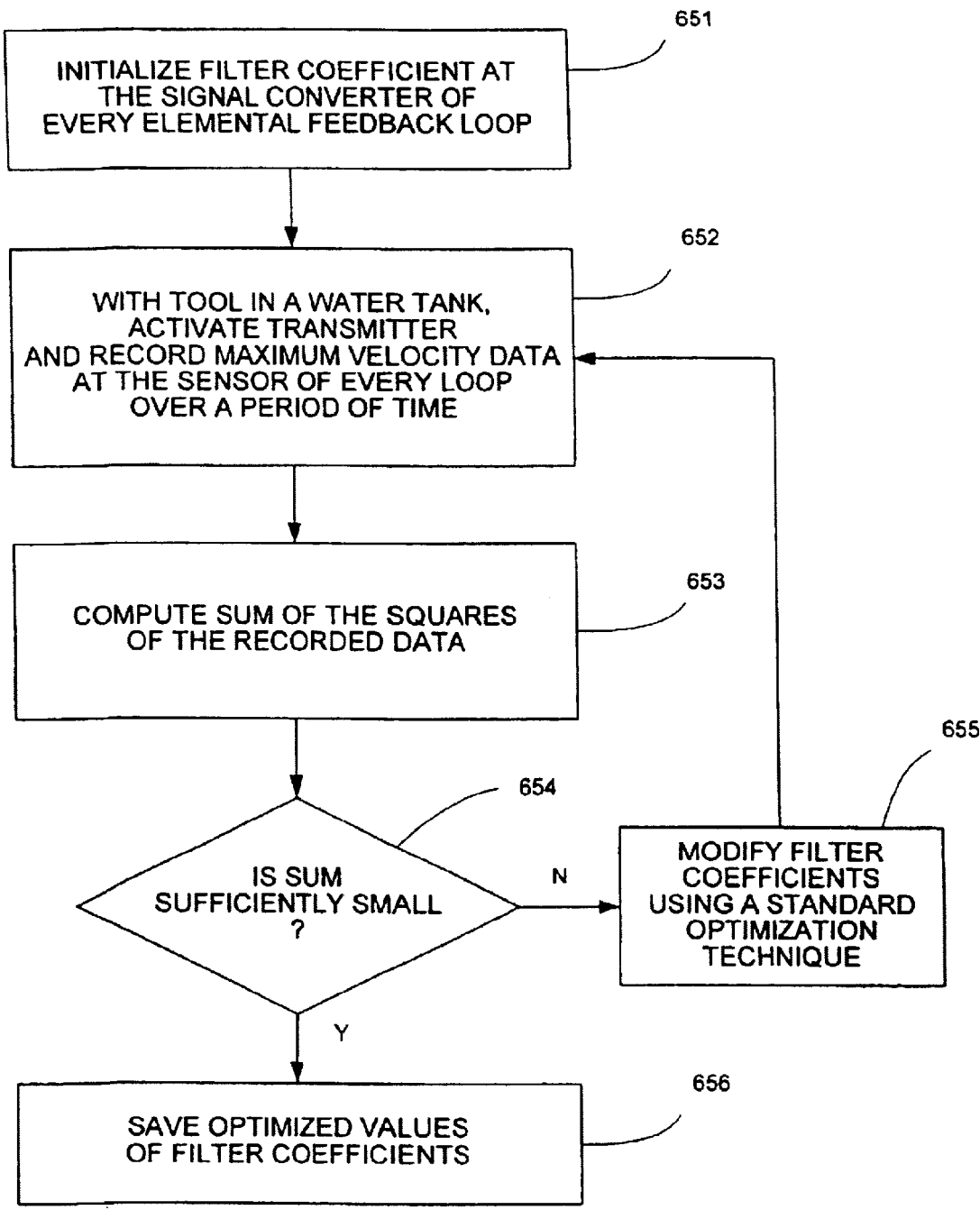
FIG. 14 is a flowchart for determining filter coefficients for the flowchart of FIG. 13.

A first preferred method for active reduction of tool borne noise, a method using weighted-feedback, is illustrated in FIGS. 13, and 14, with reference to FIGS. 1, 9, and 11. The first preferred method may be used with the LWD tool illustrated in FIG. 1, or with the wireline tool illustrated in FIG. 8.

FIG. 13 is a flowchart illustrating the first preferred method for active reduction of tool borne noise using weighted-feedback.

A conventional acoustic logging tool for measuring formation velocity typically includes an acoustic transmitter and an array of acoustic receivers at spaced-apart receiver stations along a length of the tool. The present invention provides at each receiver station an azimuthal array of radially-oriented, electro-acoustic actuators, each actuator having a plurality of elements applying force between a given azimuthal region of cylindrical tool surface and a corresponding azimuthal region of cylindrical reaction mass. The present invention also provides at each receiver station an azimuthal array of radially-oriented, acoustic vibration sensor elements (accelerometers). The preferred embodiment also provides a feedback controller, including a digital signal processor such as one from the TMS320® family of digital signal processors and its associated FIR filter software. Each FIR filter of the invention uses at least two coefficients. In the preferred embodiment each FIR filter is a 7-order FIR filter having seven coefficients. The filter is configured using software provided with the TMS320® family.

Configuring the tool for feedback operation includes coupling, at each receiver station, the electrical output of each vibration sensor to the input of its associated A/D converter, coupling the digital output of each A/D converter to its associated FIR filter, coupling the digital output of the FIR filter to its associated D/A converter to its associated element in its associated azimuthal array of actuators. The set of processes for a feedback loop for a given element of the azimuthal array of actuators is referred to herein as an "elemental feedback loop". The first elemental feedback loop includes first feedback signal converter 101 illustrated in FIG. 9.

Configuring the tool for feedback operation also includes determining a desired (effective) set of predefined FIR filter coefficients for every FIR filter, and setting the filter coefficients of every FIR filter.

Having set the coefficients of each FIR filter, and powered the feedback controller, the A/D's and the D/A's, the system will operate continuously, each elemental feedback loop operating independently and simultaneously (except for some shared data-processing resources that may operate sequentially in the processor). FIG. 13 illustrates the closed loop parallel operation of the components of the elemental feedback loops. (Only one loop is shown).

the preferred feedback method, axial weighting is performed digitally using FIR filters. However the use of any suitable digital signal processing (DSP) filter to perform axial weighting falls within the scope of the present invention.

A FIR filter ("Finite Impulse Response" filter) is one of two primary types of digital filter used in digital signal processing (DSP) applications. The impulse response is "finite" because there is no feedback in the filter. Inputting an impulse (that is, a single "1" sample followed by many "0" samples), eventually produces a series of zeros after the "1" sample has made its way in the delay line past all the coefficients. Specifically, the "impulse response" of a FIR filter is the set of FIR coefficients, as the "1" sample moves past each coefficient in turn to form the output.

Feedback Method: Setting Coefficients of FIR Filters

For active reduction of tool borne noise, the coefficients of each of the FIR filters are set for a given formation and a given tool configuration, to minimize the RMS amplitude of the tool vibration over a selected period of time. The selected period of time is a time long enough to allow the last of the spurious signals at all vibration sensor assemblies caused by a given impulse of tool borne noise to be generated and to die down. The selected period of time is approximately equal to the time between a spurious signal caused by an impulse of tool borne noise appearing at the nearest vibration sensor assembly of the vibration sensor array, and a spurious signal caused by the same impulse of tool borne noise dying away at the furthest vibration sensor assembly of the vibration sensor array. This time includes the transit times of multiple couplings and re-couplings of energy between the tool and the borehole wall.

It depends, among other things, on tool geometry and formation velocity.

A desired (effective) set of values for the FIR filter coefficients for the FIR filter of the signal converter of every elemental feedback loop (step 601 in FIG. 13) is determined by arbitrarily setting initial values and then optimizing the values experimentally, in situ, as illustrated in the flow diagram of FIG. 14. Preferably, initial values of coefficients of each FIR filter are set to be equal to optimized coefficient values determined experimentally using an optimization process performed with the tool in water. This takes into account tool geometry and is a useful approximation for a wide range of formation velocities. Alternatively, optimized coefficient values could be determined in similar manner using a computer simulation of a tool in water.

Having determined the optimized values experimentally in situ (the process of FIG. 14), the FIR filter coefficients are set in the FIR filter coefficient memory within the feedback controller (step 602 in FIG. 13).

The preferred method of the present invention includes further tuning the coefficients in situ using the process of FIG. 14 to take into account actual on-site characteristics, including actual formation velocity. In this way, the values of filter coefficients may be continuously tuned up using previous tool "firings" during a logging operation.

Details of the optimization process illustrated in FIG. 14 are as follows.

a. Initialize the value of the seven coefficients of the FIR filter in every elemental feedback loop. On a first occasion, this may be done arbitrarily. Later, initial values may be used based on the operators own prior experience.

b. Fire the acoustic transmitter and record maximum velocity over time at the vibration sensor assembly location of every elemental feedback loop while the tool is in a water tank and the feedback system running. Preferably this is done experimentally, but it may be done by computer simulation. (If the recorded data were graphed, it would look something like the printout of FIG. 18).

c. Compute the sum of the squares of the recorded data over the entire vibration sensor array and over the duration of the experiment.

d. Modify the values of the seven FIR filter coefficients for each FIR filter using a standard optimization technique (e.g., gradient based search, Newton's method, etc.) to minimize the sum of the squares.

e. Repeat steps 602–604 until the sum is sufficiently small.

f. Save optimized values of filter coefficients for use during logging.

Feed-Forward Method

Figure 15:
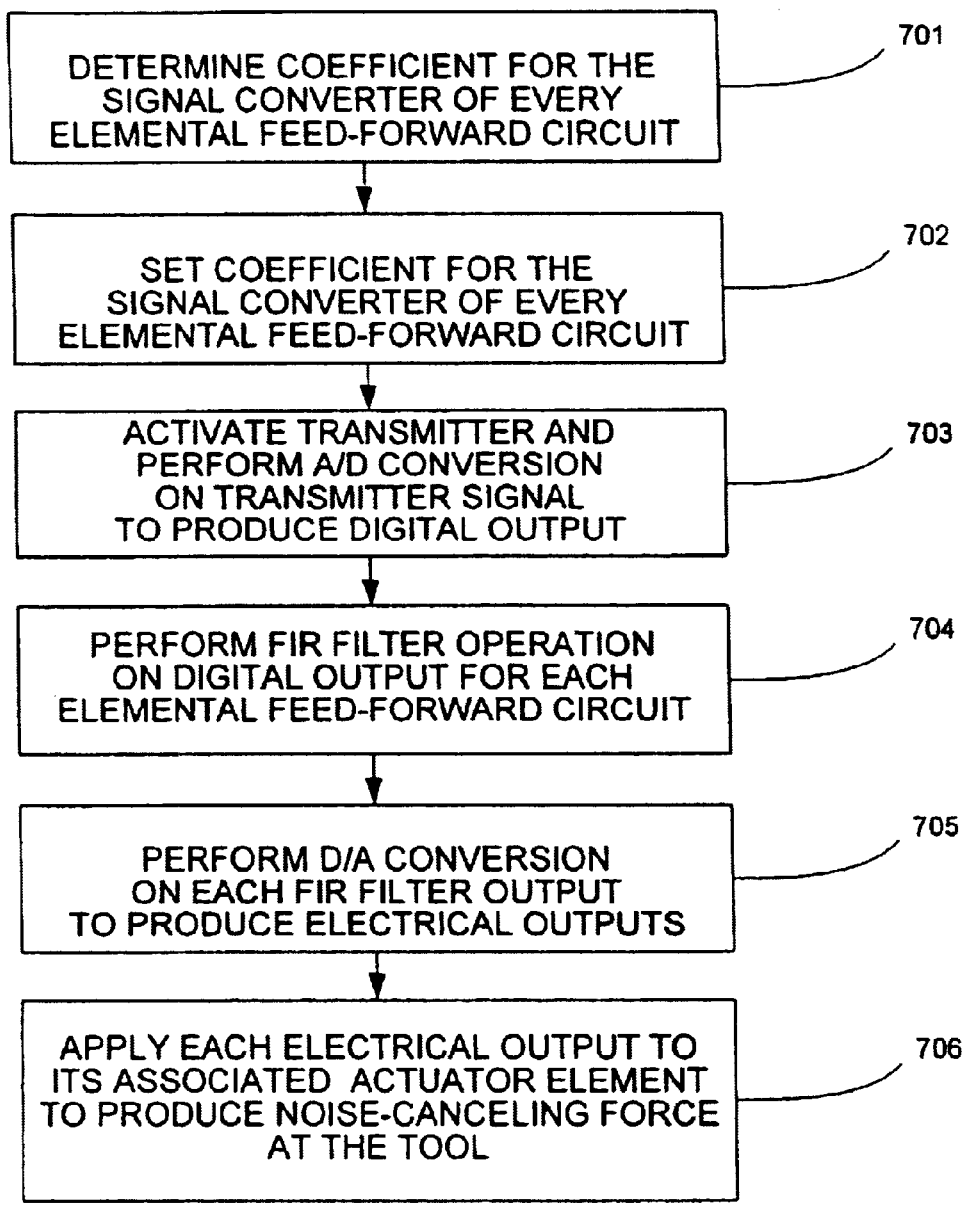
FIG. 15 is a flowchart for the first preferred embodiment of a feed-forward method for active reduction of tool borne noise.
Figure 16:
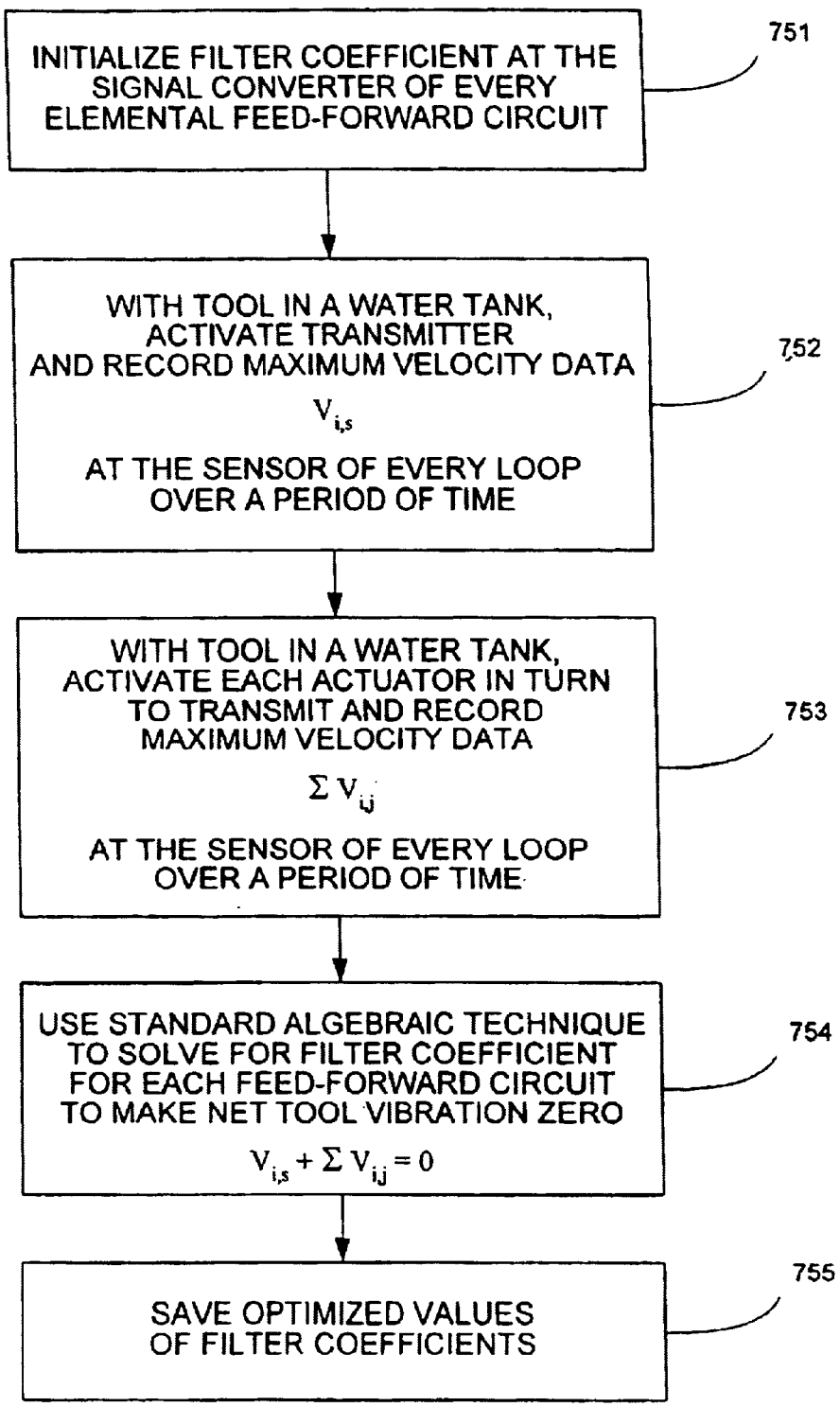
FIG. 16 is a flowchart of the preferred method for determining filter coefficients for the feed-forward method of FIG. 15.

A second preferred method for active reduction of tool borne noise, a method using feed-forward active control, is illustrated in FIGS. 15–17, with reference to FIGS. 1, 9, and 12. The second preferred method may be used with the LWD tool illustrated in FIG. 1, or with the wireline tool illustrated in FIG. 8.

In the flowchart of FIG. 15, the electrical signals to the actuators are each computed purely as a function of the input signal to the tool acoustic transmitter. The signals as a group are optimized so as to minimize the predicted tool vibration. Because this scheme uses feed-forward and a predetermined weighting pattern, the axial array of vibration sensor assemblies mounted at an inner surface of the drill collar is not essential. For simpler embodiments the axial array of vibration sensor assemblies can be omitted. However, if vibration sensor assemblies are omitted, vibration sensor assemblies will be required in an experimental tool to determine the appropriate filter coefficients.

Feed-Forward Method: Setting Coefficients of FIR Filters

The FIR filter coefficient for the signal converter of every elemental feed-forward circuit (step 701 in FIG. 15) is determined as follows.

Having optimized the values of the filter coefficients experimentally in situ (the process of FIG. 16), the FIR filter coefficients are set in the FIR filter coefficient memory within the feed-forward controller (step 702 in FIG. 15). The procedure use to determine the filter coefficients is illustrated in the flowchart of FIG. 16. The process involves running an experiment or computer simulation of the tool in an appropriate environment using a unit pulse as the source signal at the transmitter and record tool vibration history at all vibration sensor assembly locations. Tool vibration history is a time series of velocity values at each of multiple stations axially spaced-apart along the tool where the acoustic receivers and the feed-forward system vibration sensor assemblies are located. A graph of tool vibration history would look like the graph of FIG. 18, except that the graph would have just eight traces, one trace for each of the eight vibration sensor assemblies of the preferred embodiment.

The desired (effective) predetermined FIR filter coefficients are determined by using an algebraic technique to solve for zero vibration at all stations. The algebraic technique includes: a) firing the acoustic transmitter with a unit pulse and recording tool vibration at every element of every station with the active control system not running; b) applying a unit pulse at the active elements of the first station with the appropriate azimuthal weighting (constant for monopole, sinusoidal for dipole) and recording the tool vibration at every element of every station with the active control system not running; c) repeating b) for each of the active stations; d) using all the tool vibration recordings from a)–c) to compute the appropriate FIR filter coefficients so that the resulting tool vibration at all stations is zero when the feed-forward control system is running.

The computation procedure and equations are shown in FIG. 17. Effective values for filter coefficients for each of the control units are calculated using standard algebraic techniques so as to make the net tool vibration signal at the vibration sensor assembly locations equal to zero. That is, in FIGS. 16 and 17, $V_{i,s} + \Sigma V_{i,j} = 0$. This equation states that net velocity at each node is zero, which represents full cancellation of tool vibration at all acoustic receivers.

Experimental Test Data (Computer Simulation)

The feedback control schematic of FIG. 11 is a signal-processing diagram that models the dynamic response of the tool and the control system This model was used to test various implementations of the method. Testing was done using finite difference computer simulation in MATLAB. The weighted signals are indicated in FIG. 11 as $C_1$–$C_{11}$, one weighted signal from each vibration sensor. The control units (embodied as FIR filters) are indicated in FIG. 11 as $H_1$–$H_n$.

Tests conducted by computer simulations provided the following data supporting the viability of the method and apparatus of the present invention.

Figure 18:
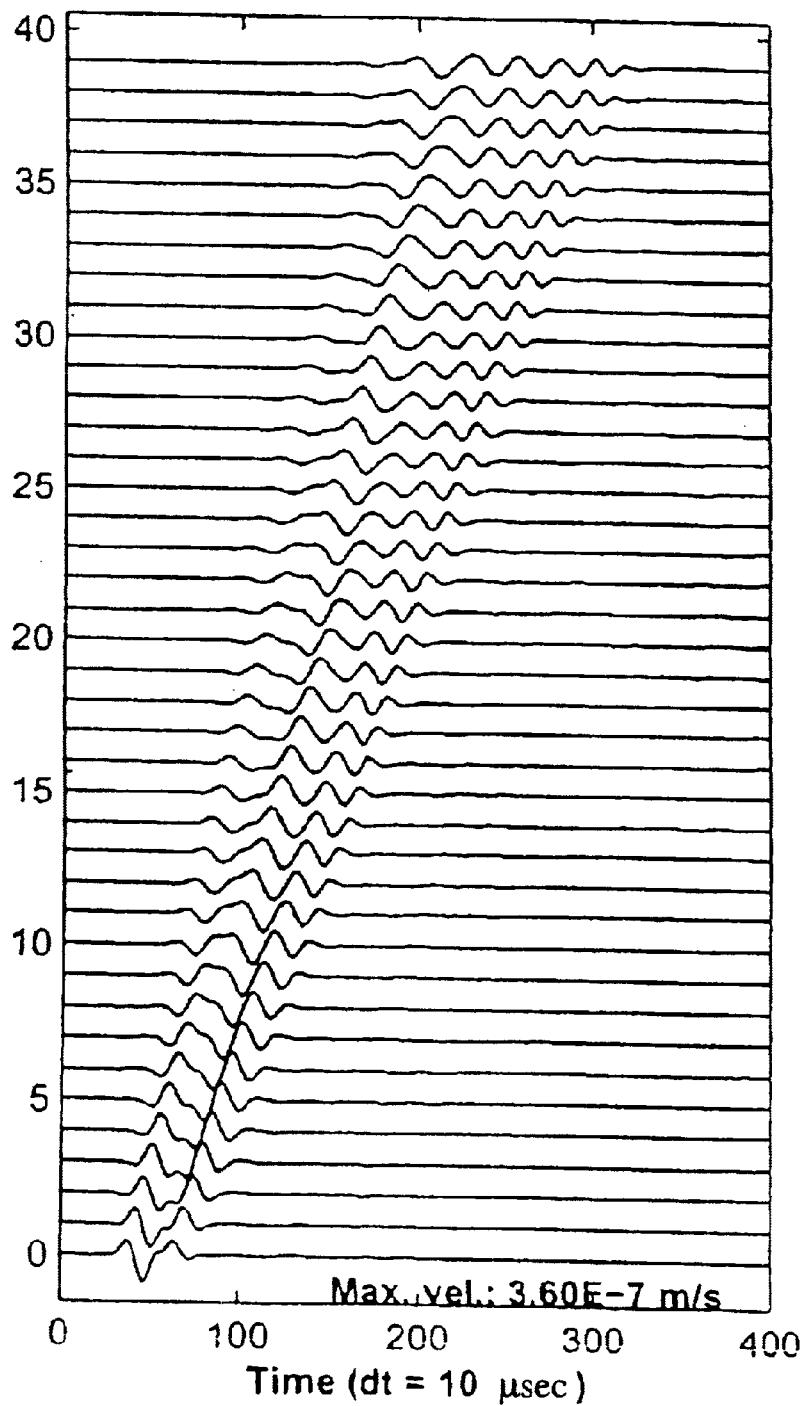
FIG. 18 is a graph of data generated by a computer simulation of a logging system having a periodic array of acoustic receivers but no active control scheme for canceling tool waves. The graph shows pipe wall velocity at each of the receivers when the tool is placed in a fluid filled borehole and the transmitter is used to excite the borehole flexural mode.

FIG. 18 is a graph showing pipe wall velocity at the receivers of a periodic array of acoustic receivers, from data generated by a computer simulation of no active control.

Figure 19:
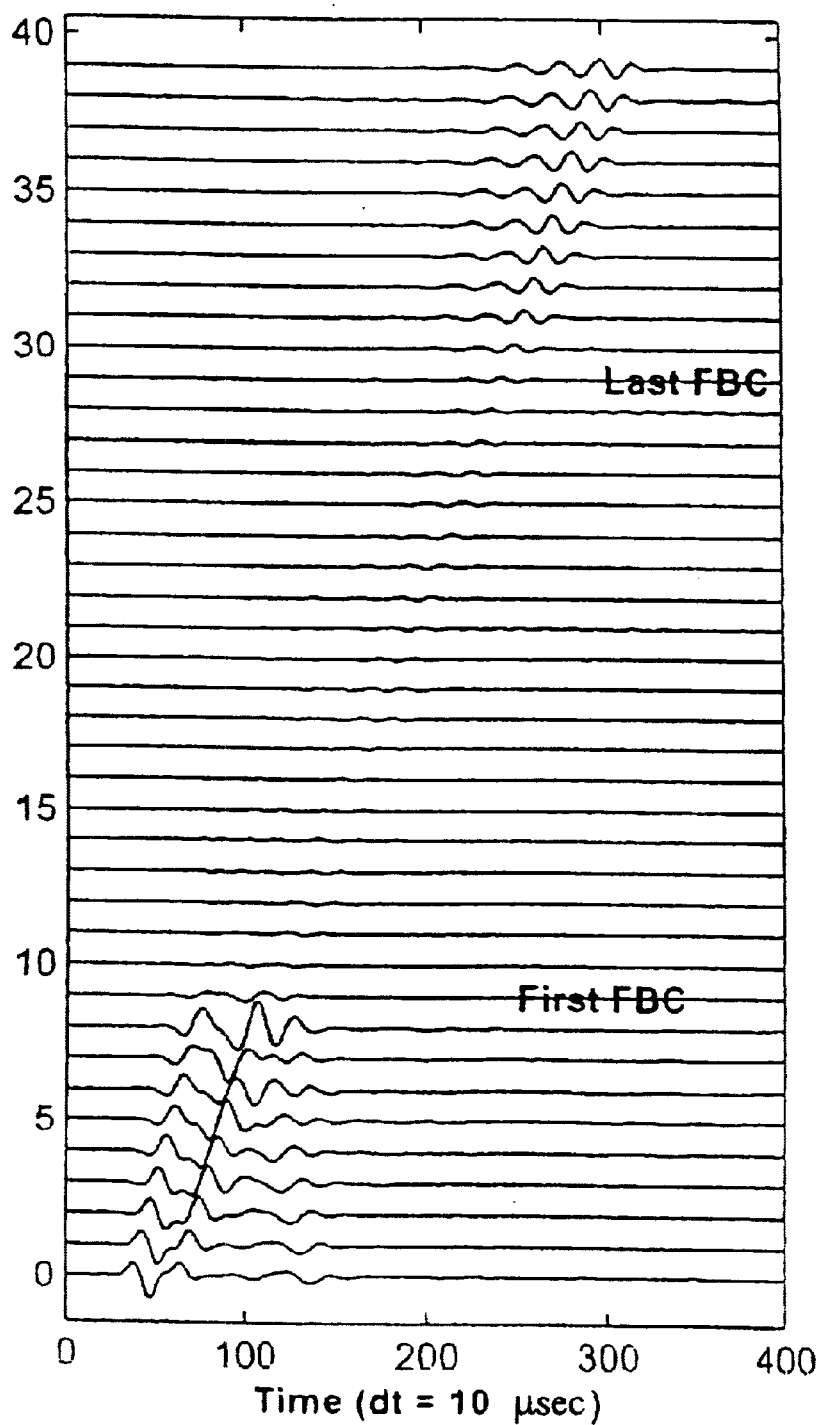
FIG. 19 is a graph of data generated by a computer simulation of a logging system having a periodic array of acoustic receivers with an active feedback method for canceling tool waves. The graph shows pipe wall velocity at each of the receivers when the tool is placed in a fluid filled borehole and the transmitter is used to excite the borehole flexural mode.

FIG. 19 is a graph showing pipe wall velocity at the receivers of a periodic array of acoustic receivers, from data generated by a computer simulation of the first preferred embodiment, feedback method, to cancel tool waves. The graph shows that cancellation is quite effective even though filter coefficients were not optimized for this case. The filter coefficients used were optimized for a simple straight tube in a water tank. The graph also shows how the tool vibration starts to grow back above the actuator array because of re-coupling.

Figure 20:
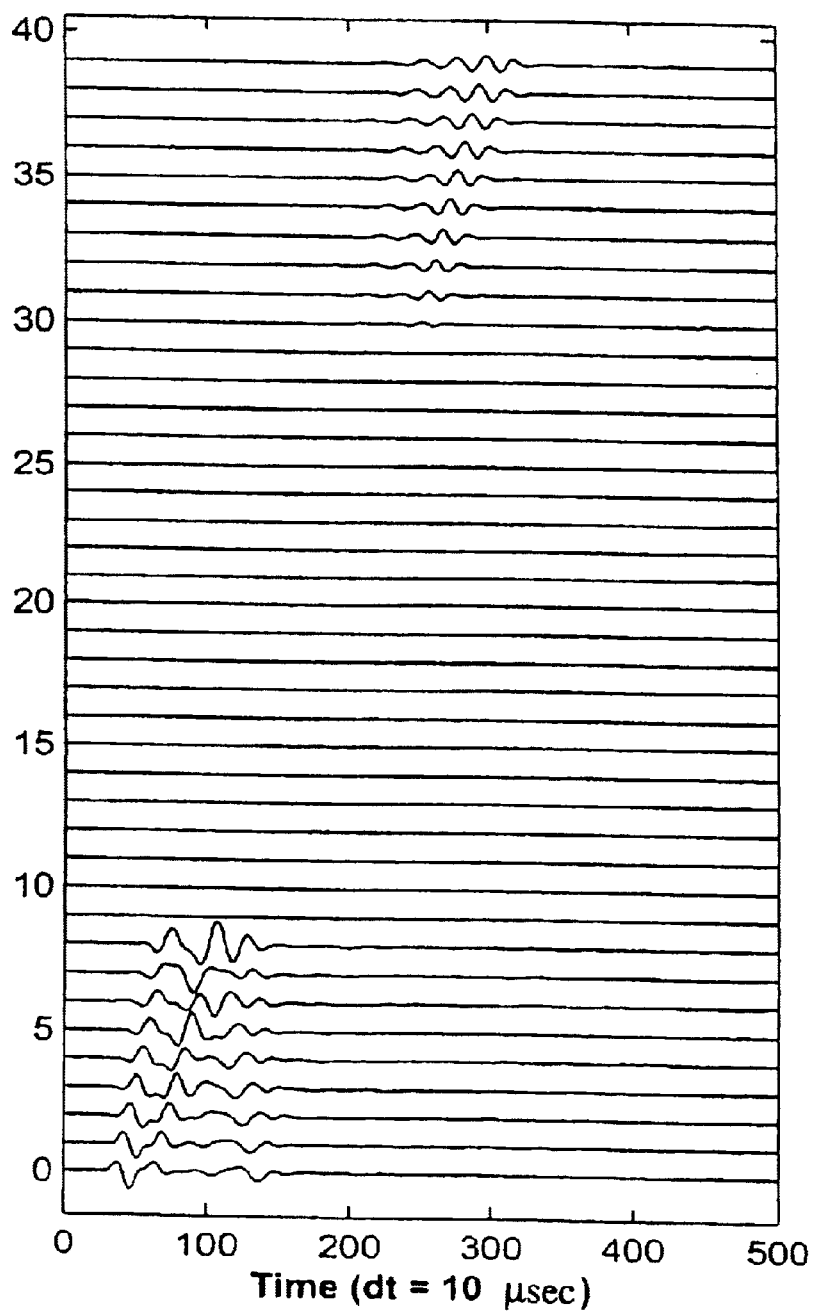
FIG. 20 is a graph of data generated by a computer simulation of a logging system having a periodic array of acoustic receivers with an active feed-forward control scheme for canceling tool waves. The graph shows pipe wall velocity at each of the receivers when the tool is placed in a fluid filled borehole and the transmitter is used to excite the borehole flexural mode.

FIG. 20 is a graph showing pipe wall velocity at the receivers of a periodic array of acoustic receivers, from data generated by a computer simulation using the feed-forward control alternative to cancel tool waves.

What is claimed is:

1. A method for reducing tool borne noise in a sonic logging tool having an acoustic transmitter and an axial array of acoustic receivers, said method comprising canceling tool mode vibration using an axially distributed active control system, wherein the location of each acoustic receiver defines a station, wherein actively canceling tool mode vibration includes applying a force to said tool at each station, wherein each force is applied in feedback mode, further including measuring tool mode vibration at each station, wherein the value of the force at each station is established by a real-time computational algorithm using feedback, said method further comprising canceling tool mode vibration using an axially distributed active control system, wherein the feedback includes constant azimuthal weighting to accommodate monopole tool mode vibration.

2. A method for reducing tool borne noise in a sonic logging tool having an acoustic transmitter and an axial array of acoustic receivers, said method comprising canceling tool mode vibration using an axially distributed active control system, wherein the location of each acoustic receiver defines a station, wherein actively canceling tool mode vibration includes applying a force to said tool at each station, wherein each force is applied in feedback mode, further including measuring tool mode vibration at each station, wherein the value of the force at each station is established by a real-time computational algorithm using feedback, said method further comprising canceling tool mode vibration using an axially distributed active control system, wherein the feedback includes sinusoidal azimuthal weighting to accommodate dipole tool mode vibration.

3. A method according to claim 2, wherein the computational algorithm includes digital signal processing of signals from a vibration sensor assembly.

4. A method according to claim 3, wherein digital signal processing of signals includes FIR filter processing.

5. A method according to claim 4, wherein the force applied at a given station is a function of tool mode vibration measured at that station, and a set of coefficients having predetermined values.

6. A method according to claim 5, wherein the predetermined values of the coefficients are determined by an iterative optimization technique.

7. A method according to claim 5, wherein each FIR filter uses at least two coefficients.

8. A method according to claim 6, wherein the iterative optimization technique comprises:
   a) initializing the value of the coefficient of the FIR filter in each elemental feedback loop;
   b) firing the acoustic transmitter and recording vibration at every element of every station of a tool for a period of time with the tool in a water tank and the feedback system running;
   c) summing the squares of the recorded data;
   d) modifying filter coefficients using an optimization technique to minimize sum of squares;
   e) repeating steps b)–d) until the sum is sufficiently small; and
   f) saving optimized values of filter coefficients.

9. A method for reducing tool borne noise in a sonic logging tool having an acoustic transmitter and an axial array of acoustic receivers, said method comprising canceling tool mode vibration using an axially distributed active control system, wherein the location of each acoustic receiver defines a station, wherein actively canceling tool mode vibration includes applying a force to said tool at each station, wherein each force is applied in feedback mode, further including measuring tool mode vibration at each station, wherein the value of the force at each station is established by a real-time computational algorithm using feedback, said method further comprising canceling tool mode vibration using an axially distributed active control system, wherein the feedback includes azimuthal weighting to accommodate quadrupole tool mode vibration.

10. A method according to claim 3, wherein digital signal processing of signals includes IIR filter processing.

11. A method for reducing tool borne noise in a sonic logging tool having an acoustic transmitter and an axial array of acoustic receivers, said method comprising canceling tool mode vibration using an axially distributed active control system, wherein the location of each acoustic receiver defines a station, wherein actively canceling tool mode vibration includes applying a force to said tool at each station, wherein each force is applied in feed-forward mode, and wherein applying a force includes applying a force with constant azimuthal weighting to accommodate monopole tool mode vibration.

12. A method for reducing tool borne noise in a sonic logging tool having an acoustic transmitter and an axial array of acoustic receivers, said method comprising canceling tool mode vibration using an axially distributed active control system, wherein the location of each acoustic receiver defines a station, wherein actively canceling tool mode vibration includes applying a force to said tool at each station, and wherein applying a force includes applying a force with sinusoidal azimuthal weighting to accommodate dipole tool mode vibration.

13. A method for reducing tool borne noise in a sonic logging tool having an acoustic transmitter and an axial array of acoustic receivers, said method comprising canceling tool mode vibration using an axially distributed active control system, wherein the location of each acoustic receiver defines a station, wherein actively canceling tool mode vibration includes applying a force to said tool at each station, and wherein the force applied at a given station is a function of transmitter output and the predetermined values of the FIR filter coefficients associated with the given station to accommodate a particular mode of tool mode vibration.

14. A method according to claim 13, wherein the predetermined values are determined by using an algebraic technique to solve for zero vibration at all stations.

15. A method according to claim 13, wherein each FIR filter uses a number of coefficients, up to a number as large as the number of time samples used to define the acoustic transmitter firing pulse.

16. A method for reducing tool borne noise in a sonic logging tool having an acoustic transmitter and an axial array of acoustic receivers, said method comprising canceling tool mode vibration using an axially distributed active control system, wherein the location of each acoustic receiver defines a station, wherein actively canceling tool mode vibration includes applying a force to said tool at each station, wherein the value of each force is established by a real-time computational algorithm in an active feed-forward control system, and wherein the real-time computational algorithm comprises:

a) firing the acoustic transmitter with a unit pulse and recording tool vibration at every element of every station with the active control system not running;

b) applying a unit pulse at active elements of a first station having active elements, applying the unit pulse with the appropriate azimuthal weighting, including constant azimuthal weighting for monopole configuration, including sinusoidal azimuthal weighting for dipole configuration, and recording tool vibration at every element of every station, with the active control system not running;

c) repeating b) for every station having active elements;

d) using all the tool vibration recordings from a)–c) to compute a value for every FIR filter coefficient so that the resulting tool vibration at all stations is zero when the feed-forward control system is running; and e) saving computed values of filter coefficients.

17. An acoustic logging tool that can be positioned within a fluid-filled borehole said tool comprising:

an elongated cylinder defining an axis;

an acoustic transmitter mounted to said cylinder;

an axial array of acoustic receivers mounted along said cylinder; and an axially distributed active vibration control system;

wherein said control system includes at least one cylindrical reaction mass co-axially mounted within said cylinder, and an axial array of actuators coupled to exert force between said at least one cylindrical reaction mass and said cylinder.

18. An acoustic logging tool according to claim 17, wherein the location of each acoustic receiver defines a station, and wherein said axial array of actuators includes one actuator assembly located at each station.

19. An acoustic logging tool according to claim 18, wherein each actuator assembly includes multiple actuators in an azimuthal array.

20. An acoustic logging tool according to claim 19,
wherein said control system includes a plurality of electrical outputs;

wherein each actuator element is wired to receive a corresponding one of said plurality of electrical outputs.

21. An acoustic logging tool according to claim 19, further comprising an axial array of vibration sensor assemblies, one vibration sensor assembly located at each station.

22. An acoustic logging tool according to claim 21, wherein an output signal from each vibration sensor assembly is coupled to said control system.

23. A method for reducing tool borne noise in a sonic logging tool having an acoustic transmitter and an axial array of acoustic receivers, said method comprising canceling tool mode vibration using an axially distributed active control system, wherein actively canceling tool mode vibration includes applying a force to said tool, further including measuring tool mode vibration, wherein the value of the force is established by a real-time computational algorithm, wherein the feedback includes azimuthal weighting to accommodate a particular mode of tool mode vibration.

24. A method according to claim 23, wherein said particular mode is monopole mode.

25. A method according to claim 23, wherein said particular mode is bipole mode.

26. A method according to claim 23, wherein said particular mode is quadrupole mode.

* * * * *